US010013117B2

(12) United States Patent
Imai et al.

(10) Patent No.: US 10,013,117 B2
(45) Date of Patent: Jul. 3, 2018

(54) LIGHT CURTAIN INSTALLATION METHOD AND INTERACTIVE DISPLAY APPARATUS

(71) Applicant: SEIKO EPSON CORPORATION, Tokyo (JP)

(72) Inventors: Shun Imai, Matsumoto (JP); Yasuhiro Honda, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/126,805

(22) PCT Filed: Mar. 27, 2015

(86) PCT No.: PCT/JP2015/001780
§ 371 (c)(1),
(2) Date: Sep. 16, 2016

(87) PCT Pub. No.: WO2015/146190
PCT Pub. Date: Oct. 1, 2015

(65) Prior Publication Data
US 2017/0090678 A1   Mar. 30, 2017

(30) Foreign Application Priority Data
Mar. 28, 2014 (JP) .................... 2014-068253

(51) Int. Cl.
*G06F 3/00* (2006.01)
*G06F 3/042* (2006.01)
(Continued)

(52) U.S. Cl.
CPC .......... *G06F 3/0428* (2013.01); *G06F 3/0418* (2013.01); *H04N 9/3185* (2013.01); *H04N 9/3194* (2013.01)

(58) Field of Classification Search
CPC ..... G06F 3/0428; G06F 3/0418; G06F 3/0421
See application file for complete search history.

(56) References Cited

U.S. PATENT DOCUMENTS 7,185,987 B2   3/2007   Tamura
7,502,018 B2   3/2009   Tamura
(Continued)

FOREIGN PATENT DOCUMENTS

JP   2003-276399 A   9/2003
JP   2004-101317 A   4/2004
(Continued)

OTHER PUBLICATIONS

Jun. 2, 2015 Search Report issued in International Patent Application No. PCT/JP2015/001780.
Nov. 7, 2017 Search Report issued in European Patent Application No. 15768889.6.

*Primary Examiner* — Kevin M Nguyen
(74) *Attorney, Agent, or Firm* — Oliff PLC

(57) ABSTRACT

A light curtain installation method, which is a method for adjusting or checking an installation state of a light curtain for detecting an operation with respect to an image plane of a display apparatus, includes: determining whether or not it is possible to detect an object that comes into contact with a target region on the image plane which corresponds to a reference pixel which is a pixel at a predetermined position; and setting a drive state of the reference pixel such that the drive state of the reference pixel is different depending on a result of the determining.

7 Claims, 10 Drawing Sheets

(51) Int. Cl.
*G06F 3/041* (2006.01)
*H04N 9/31* (2006.01)

(56) References Cited

U.S. PATENT DOCUMENTS

| | | | |
|---|---|---|---|
| 8,305,344 B2 | 11/2012 | Tamura | |
| 2005/0078279 A1 | 4/2005 | Tamura | |
| 2005/0083301 A1 | 4/2005 | Tamura | |
| 2007/0188475 A1 | 8/2007 | Tamura | |
| 2009/0262098 A1 | 10/2009 | Yamada | |
| 2010/0225618 A1* | 9/2010 | Yamashita | G06T 7/74 345/175 |
| 2011/0242054 A1 | 10/2011 | Tsu | |
| 2012/0035934 A1 | 2/2012 | Cunningham | |
| 2012/0212415 A1 | 8/2012 | Yokobayashi | |
| 2013/0127750 A1* | 5/2013 | Horiuchi | G06F 3/0416 345/173 |
| 2014/0253513 A1* | 9/2014 | Matsubara | G06F 3/0425 345/175 |

FOREIGN PATENT DOCUMENTS

| | | |
|---|---|---|
| JP | 2005-115870 A | 4/2005 |
| JP | 2005-128611 A | 5/2005 |
| JP | 2007-328754 A | 12/2007 |
| JP | 2011-216088 A | 10/2011 |
| JP | 2012-173447 A | 9/2012 |
| WO | 2013/104060 A1 | 7/2013 |

* cited by examiner

FIG. 3A
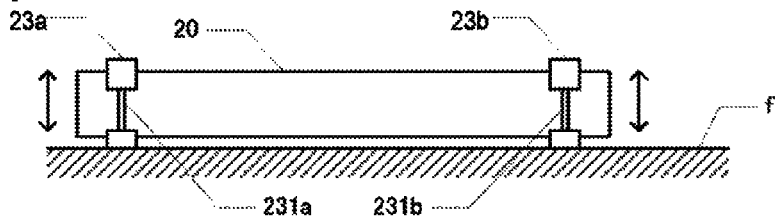
FIG. 3B
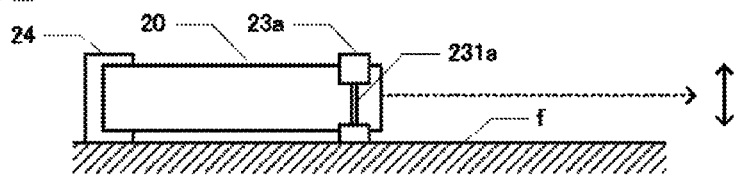
FIG. 3C
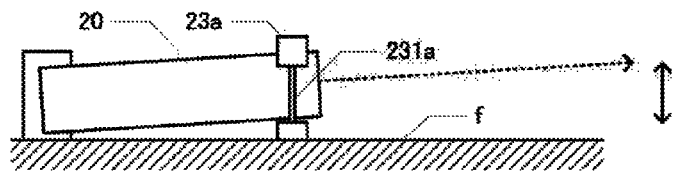
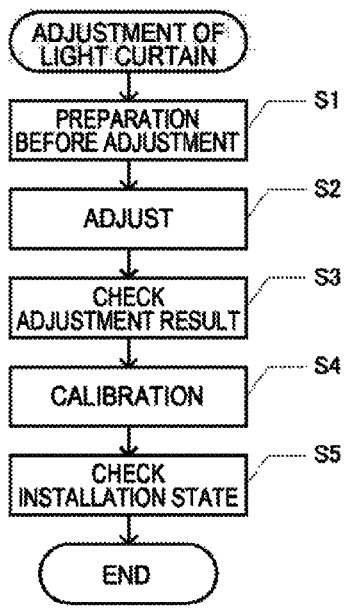
FIG. 4

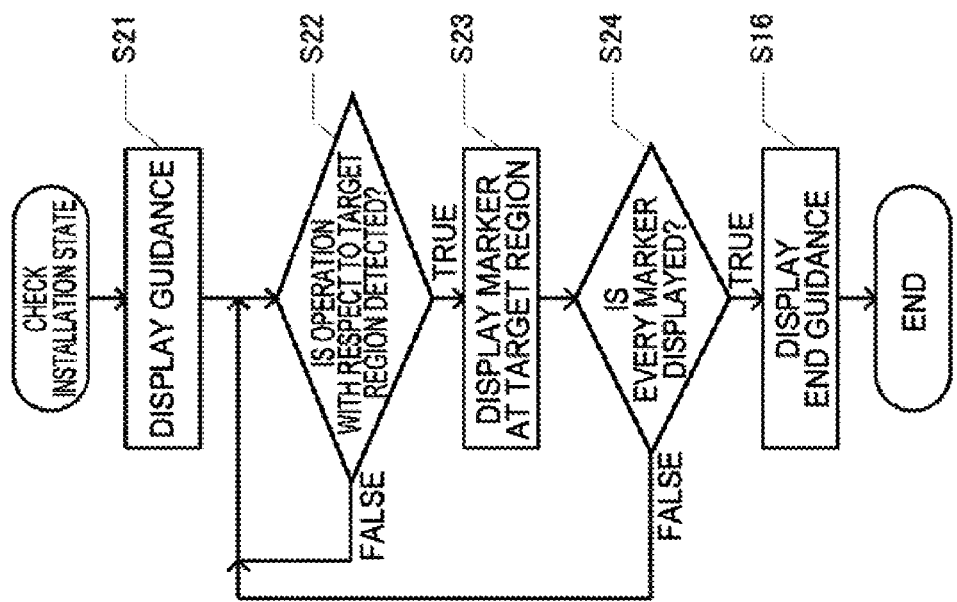

FIG. 8A
PLEASE RE-TRACE ROUND END OF IMAGE PLANE. MARKER APPEARS AT PLACE WHICH IS TRACED
E
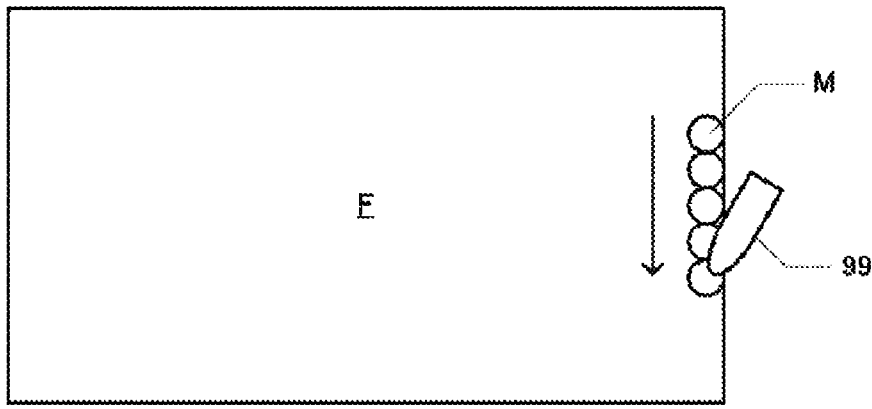
FIG. 8B
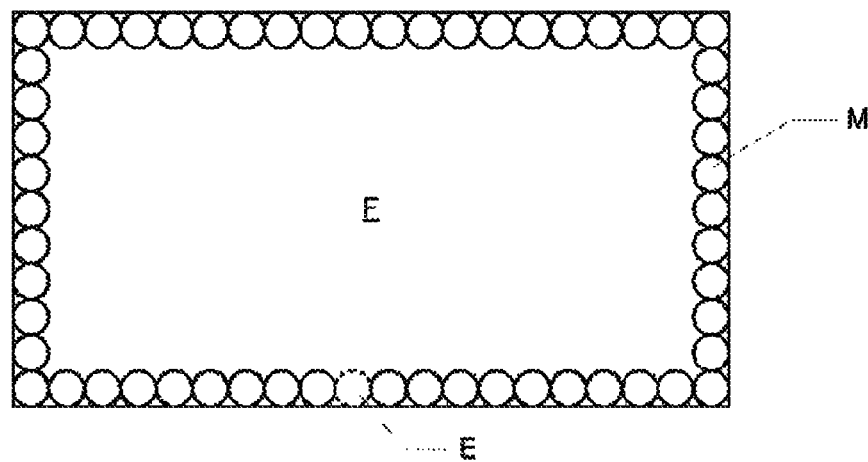
FIG. 8C

FIG. 10A

PLEASE RE-TRACE EVERY ROUND
MARKER TO BE DISPLAYED ON END
OF IMAGE PLANE WITHIN ONE MINUTE

LIGHT CURTAIN INSTALLATION METHOD AND INTERACTIVE DISPLAY APPARATUS

BACKGROUND

1. Technical Field

The present invention relates to a light curtain installation method and an interactive display apparatus.

2. Related Art

Recently, an electronic blackboard or an interactive projector, which synthesizes and displays an image based on an image signal input from an external device and an image in which an object such as a character or a picture which corresponds to an operation with respect to an image plane, has been utilized in education and conferences. Such an interactive display apparatus is known, which detects an operation with respect to an image plane using a light curtain. The light curtain radiates light in a plane shape and receives direct or reflective light of the radiated light so as to detect a presence of an object such as a finger. When the light curtain for detecting the operation with respect to the image plane is installed, a position or posture of the light curtain with respect to the image plane needs to be adjusted. For example, a light curtain, which detects an object using reflective light from the object, is adjusted such that only light reflected from the object which is in contact with a certain region of the image plane, of light from the light curtain which travels in parallel with the image plane, is incident to the light curtain.

JP-A-2012-173447 is an example of the related art.

Incidentally, since the light radiated from the light curtain expands in a plane shape, it is not easy to adjust the position or posture of the light curtain with respect to the image plane. For example, the adjustment has to be performed such that the light radiated from the light curtain is in parallel with the image plane when the image plane is viewed from a horizontal direction thereof, and the light radiated from the light curtain is in parallel with the image plane when the image plane is viewed from a vertical direction thereof. In addition, for example, even when the light curtain is installed at a correct position with a correct posture with respect to the image plane, it has to be checked whether light radiated from the light curtain and reflected from the outside of the region of the image plane is detected.

SUMMARY

An advantage of some aspects of the invention is that an installation state of a light curtain with respect to an image plane is simply adjusted or checked.

(1) A light curtain installation method for adjusting or checking an installation state of a light curtain for detecting an operation with respect to an image plane of a display apparatus according to an aspect of the invention includes; determining whether or not it is possible to detect an object that comes into contact with a target region of the image plane which corresponds to a reference pixel which is a pixel at a predetermined position; and setting a drive state of the reference pixel such that the drive state of the reference pixel is different depending on a result of the determining.

According to the aspect of the invention, since a user can recognize, from the display state of the image plane, whether or not the object such as a finger that comes into contact with the target region on the image plane can be detected by the light curtain, it is simple to adjust or check the installation state of the light curtain with respect to the image plane.

(2) In the light curtain installation method, the drive state of the reference pixel may be changed in the setting in a case where it is possible to detect the object and the drive state of the reference pixel may not be changed in the setting in a case where it is not possible to detect the object.

In a case of employing this configuration, when the object such as the finger comes into contact with the image plane, the user can check the installation state of the light curtain by checking for whether or not the display state of the region, with which contact is performed, is changed from the state before the contact.

(3) In the light curtain installation method, a marker may be displayed in the target region on the image plane by the reference pixel in the determining, the display of the marker may be stopped in the setting in a case where it is possible to detect the object, and the display of the marker may continue in the setting in a case where it is not possible to detect the object.

In a case of employing this configuration, the user can easily recognize a position of the target region at which a check for whether or not it is possible to detect the contact of the object has to be performed and the user can check the installation state of the light curtain by checking for whether or not the operation with respect to the image plane causes the display of the marker to be stopped.

(4) In the light curtain installation method, the marker may be displayed in the target region on the image plane by the reference pixel in the setting in a case where it is possible to detect the object and the marker may not be displayed in the setting in a case where it is not possible to detect the object.

In a case of employing this configuration, the user can check the installation state of the light curtain by checking for whether or not the marker can be displayed by the operation with respect to the image plane.

(5) In the light curtain installation method, a marker may be displayed in the target region on the image plane by the reference pixel in the determining, the display of the marker may continue in the setting in a case where it is possible to detect the object, and the display of the marker may be stopped in the setting in a case where it is not possible to detect the object.

In a case of employing this configuration, the user can check the installation state of the light curtain by checking for whether or not the operation with respect to the image plane can cause the display of the marker to continue.

(6) In the light curtain installation method, the target region may be a circumferential edge section of the image plane.

When the light curtain is not installed correctly, an error of a distance between light radiated from the light curtain and the image plane is great in a region apart from a light-emitting unit of the light curtain, that is, on a circumferential edge section of the image plane. In addition, ambient light travelling into the inner side of the image plane from the outside of the image plane has a great influence on the circumferential edge section of the image plane. Thus, when the target region is set to the circumferential edge section of the image plane, it is possible to efficiently check or adjust the installation state of the light curtain.

(7) In the light curtain installation method, the marker may be formed of a dotted line, a dashed line, or a combination thereof. (8) In addition, the marker may be formed of a continuous line.

In a case of employing these configurations, it is possible to easily recognize whether or not it is possible to detect the contact of the object in the target region which extends in a line shape.

(9) An interactive display apparatus according to another aspect of the invention includes: a display unit that has pixels arranged in a matrix shape and displays an image on an image plane by driving the pixels; a light-emitting unit that is installed with respect to the image plane and radiates light in a plane shape; a position detecting unit that receives and photoelectrically converts direct or reflected light of the light radiated from the light-emitting unit and outputs a positional signal in response to the direct or reflected light; and a control unit that performs determination of whether or not it is possible to detect an object that comes into contact with a target region on the image plane which corresponds to a reference pixel which is a pixel at a predetermined position, based on the positional signal, and sets a drive state of the reference pixel such that the drive state of the reference pixel is different depending on a result of the determining.

According to the aspect of the invention, since a user can recognize, from the display state of the image plane, whether or not the object such as a finger that comes into contact with the target region on the image plane can be detected, it is simple to adjust or check the installation state of the light-emitting unit and the position detecting unit with respect to the image plane. Here, "installation with respect to the image plane" means an installation in which the position and the posture is fixed with respect to the image plane, and includes not only a direct installation on a structure of which a surface becomes the image plane, but also an installation on another structure on which the structure, of which the surface becomes the image plane, is installed.

BRIEF DESCRIPTION OF THE DRAWINGS

The invention will be described with reference to the accompanying drawings, wherein like numbers reference like elements.

FIG. 3A is a schematic view of the embodiment of the invention when viewed from the front.
FIGS. 3B and 3C are schematic views of the embodiment of the invention when viewed from a side.
FIG. 4 is a flowchart of the embodiment of the invention.
FIG. 7 is a flowchart of the embodiment of the invention.
FIGS. 8A to 8C are layouts of image planes of the embodiment of the invention.
FIGS. 10A to 10D are layouts of the image planes of the embodiment of the invention.

DESCRIPTION OF EXEMPLARY EMBODIMENTS

Hereinafter, embodiments of the invention will be described with reference to the accompanying drawings.

The same reference signs are attached to corresponding components in each drawing and description thereof will not be repeated.

1. Outline

Figure 1A:
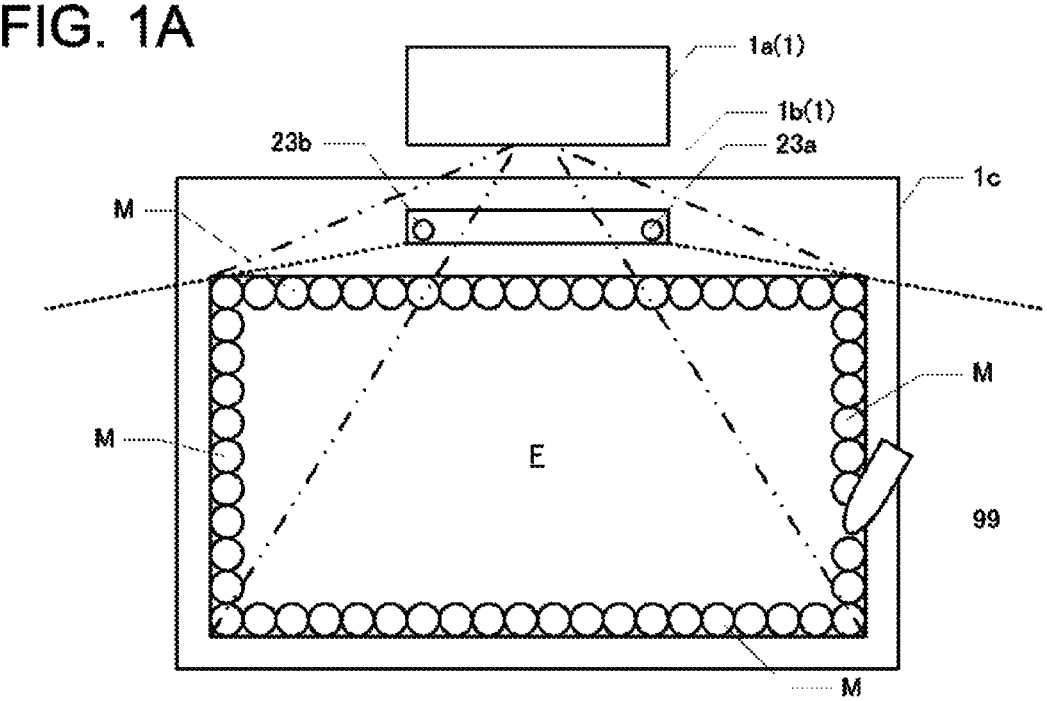
FIG. 1A is a plan view of an embodiment of the invention.
Figure 1B:
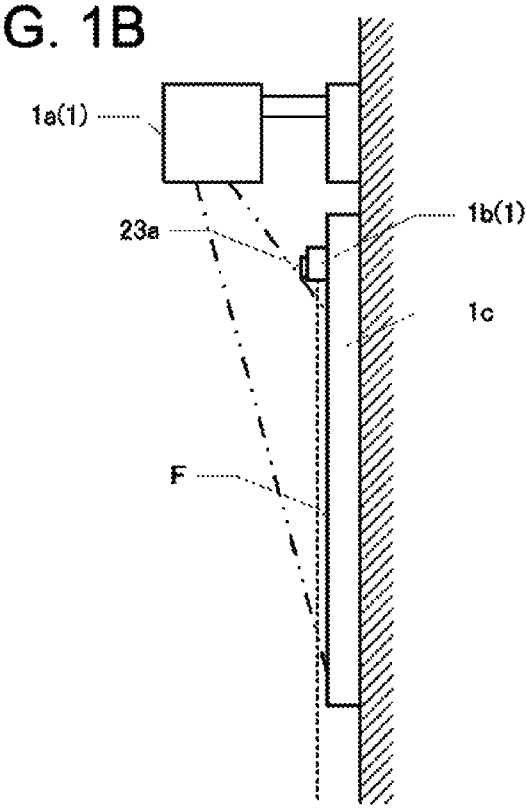
FIG. 1B is a side view of the embodiment of the invention.

A projector 1 as an example of an interactive display apparatus according to the invention illustrated in FIGS. 1A and 1B is an apparatus that projects and displays an image to an image plane F. The projector 1 projects, to the image plane F, a synthesized image in which an external image formed based on an image signal input from an external device such as a PC or a smart phone and an image of an object corresponding to an operation with respect to a projected surface are synthesized. The projector 1 includes a first housing 1a in which a display unit is accommodated and a second housing 1b in which a light-emitting unit that radiates light with an infrared wavelength as illustrated in dotted lines in FIGS. 1A and 1B in a plane shape is accommodated. When the second housing 1b is installed correctly with respect to the image plane F, the projector 1 can detect an operation with respect to the image plane F. An installation state of the second housing 1b with respect to the image plane F is adjusted by rotating two dials 23a and 23b provided on the second housing 1b. That is, by rotating the two dials 23a and 23b, an orientation of a plane formed of the light with the infrared wavelength radiated from the second housing 1b is adjusted.

After adjustment of the two dials 23a and 23b, a marker M is displayed on a circumferential edge section of the image plane F such that a user can check the installation state of the light-emitting unit. When the marker M is touched by a finger 99 or the like, the display of the marker M touched by the finger 99 or the like is stopped. The display of the marker M touched by the finger 99 or the like is stopped such that the user can recognize that the installation state is appropriate. In a case where the display of the marker M touched by the finger 99 or the like is not stopped, the user can recognize that the installation state is not appropriate.

2. Configuration of Projector

Figure 2:
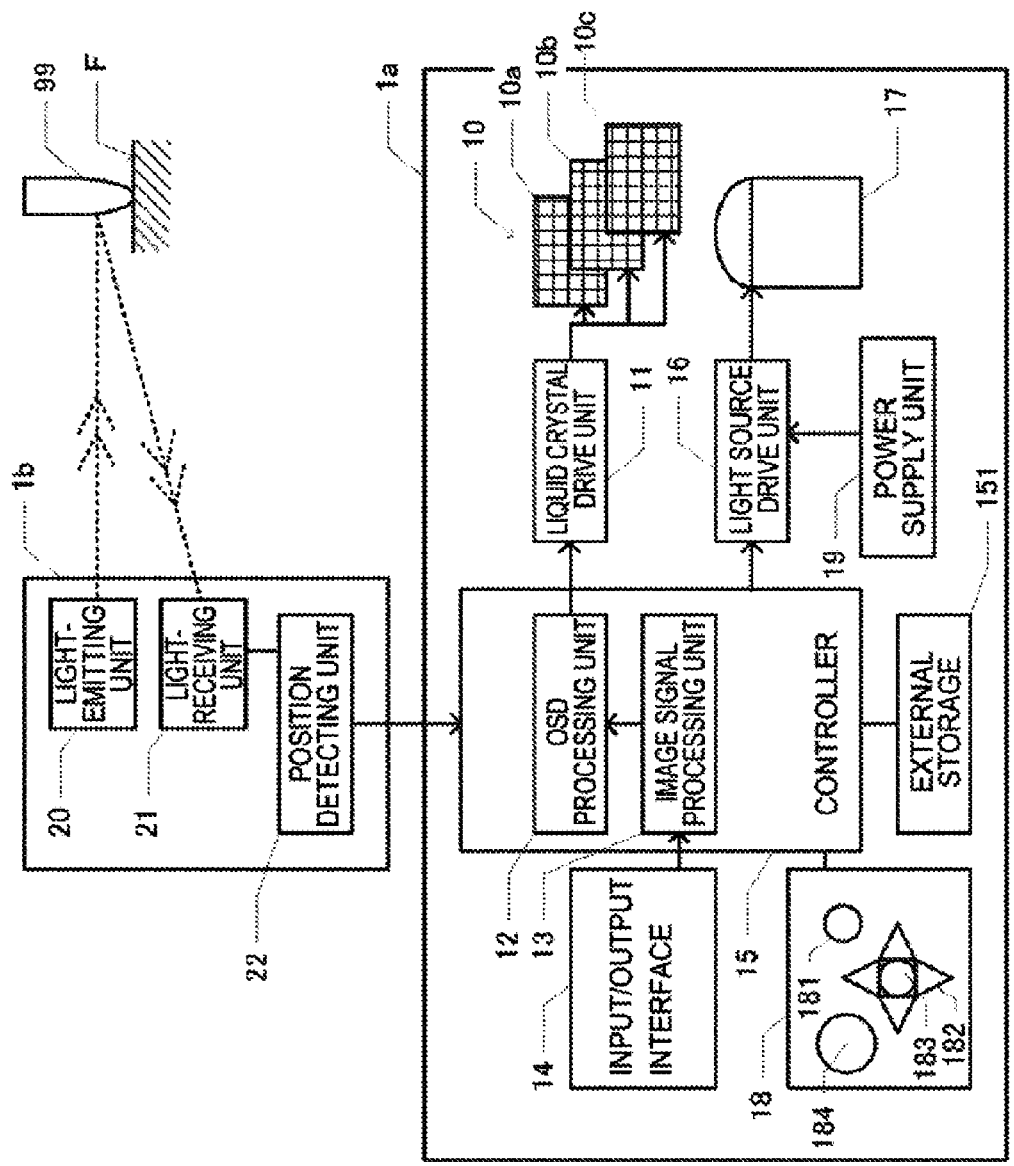
FIG. 2 is a block diagram of the embodiment of the invention.
Figure 5:
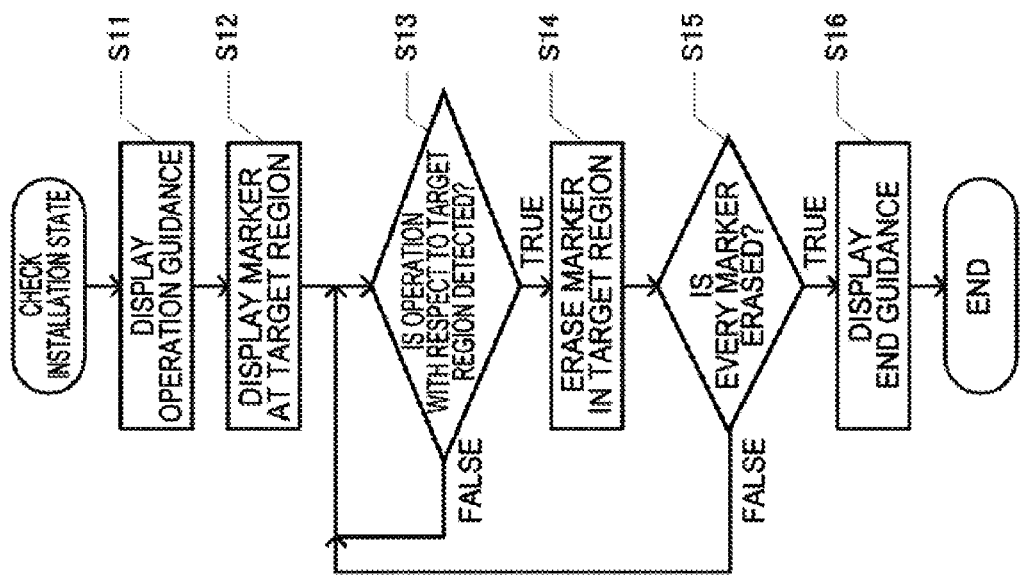
FIG. 5 is a flowchart of the embodiment of the invention.

As illustrated in FIG. 2, the projector 1 accommodates an input/output interface 14, a controller 15, an external storage 151, an operation unit 18, a power source unit 19, or the like, in addition to a light source drive unit 16, a projection light source 17, a liquid crystal light valve 10, and a liquid crystal drive unit 11 as the display unit, in the first housing 1a. In addition, the projector 1 accommodates a light-emitting unit 20, a light-receiving unit 21, and a position detecting unit 22 in the second housing 1b which is installed with respect to the image plane F. The light-emitting unit 20, the light-receiving unit 21, and the position detecting unit 22 configure the light curtain. In addition, the light-receiving unit 21 and the position detecting unit 22 configure the position detecting unit.

The projection light source 17 is configured of a high-pressure mercury vapor lamp, a light-emitting diode (LED), a laser, or the like, and is driven by the light source drive unit 16. The input/output interface 14 includes a plurality of types of input/output terminals such as a USE terminal, an Ethernet (registered trademark) terminal, an HDMI terminal, and an RS232c terminal, performs communication with the external device, and inputs various image signals from the external device. The controller 15 executes a control program which is stored in the external storage 151 and controls each unit of the projector 1. In addition, the controller 15 includes an image signal processing unit 13 and an OSD processing unit 12, executes a drawing process based on the image signals input from the external device and a positional signal input from the position detecting unit 22, and outputs a projection signal. The image signal processing unit 13 outputs image data of an external image layer and image data of an operation input layer to the OSD processing unit 12 as a result of the drawing process based on the image signals input from the external device and the positional signal input from the position detecting unit 22. The OSD processing unit 12 synthesizes items of image data of layers and outputs a projection signal corresponding to the liquid crystal light valve 10. The liquid crystal drive unit 11 converts the projection signal output from the OSD processing unit 12 into an analog signal for driving each pixel of the liquid crystal light valve 10. The liquid crystal light valve 10 includes liquid crystal panels 10$a$, 10$b$, and 10$c$, in each of which many pixels (for example, 1280 pixels×768 pixels) are arranged in a matrix shape. The liquid crystal panels 10$a$, 10$b$, and 10$c$ control transmittance of light beams with a red wavelength, a green wavelength, or a blue wavelength, which are radiated from the projection light source 17 and separated by a dichroic mirror which is not illustrated for each pixel. The operation unit 18 includes a menu key 181 for inputting an instruction of projecting an OSD menu, a selection key 182 for selecting an item of the OSD menu, a determination key 183, and a power switch 184 for switching between ON and OFF of power supply to the power source unit 19 from an external power source. The power source unit 19 supplies power to each unit of the projector 1.

The light-emitting unit 20 is a light source which radiates light with an infrared wavelength in a plane shape. The light radiated from the light-emitting unit 20 expands in a fan shape as illustrated in dotted lines in FIG. 1A. As illustrated in FIGS. 3A to 3C, the light-emitting unit 20 is fixed to an installation surface f using screws 231$a$ and 231$b$ joined with the dials 23$a$ and 23$b$ and a support member 24. The installation surface f may be a surface of a screen 1$c$ on which the image plane F is projected, may be a wall surface on which the screen 1$c$ is fixed, or may be a bottom surface of the second housing 1$b$ which is fixed on the screen is or the wall surface. The screws 231$a$ and 231$b$ are provided in the vicinity of both corners on a side surface on a side from which the light with the infrared wavelength is radiated. The support member 24 fixes an end section of the light-emitting unit 20 on a side opposite to the side, from which the light with the infrared wavelength is radiated, to the installation surface f such that the two corners of the light-emitting unit 20 are elevated from the installation surface f as illustrated in FIG. 3B and FIG. 3C by rotation of the screws 231$a$ and 231$b$ along with the dials 23$a$ and 23$b$. Such a support member 24 may be configured of an elastic member such as a rubber block.

The light-receiving unit 21 is an infrared video camera installed to image the entire image plane F, photoelectrically converts the light with the infrared wavelength, and outputs image data according to an image of the light with the infrared wavelength. The light-receiving unit 21 may be accommodated in the second housing 1$b$, in the first housing 1$a$, or in another housing.

The position detecting unit 22 analyzes the image data output from the light-receiving unit 21, thereby detecting a position at which the finger 99 is in contact with the image plane F, and outputs a positional signal representing a coordinate of the position at which the finger 99 is in contact with the image plane F. Light with the infrared wavelength which is radiated from the light-emitting unit 20, then, is reflected from an object such as the finger 99 or a rod which is in contact with the image plane F, and is incident to the light-receiving unit 21 is more intensive than light with the infrared wavelength that is incident to the light-receiving unit 21 from the outside of the image plane F. Therefore, the position detecting unit 22 analyzes the image data output from the light-receiving unit 21, thereby detecting a light-emitting position of the light with the infrared wavelength, that is, a position at which the light with the infrared wavelength is reflected from the finger 99 which is in contact with the image plane F, and outputs the positional signal representing a coordinate of the position at which the finger 99 is in contact with the image plane F. The coordinates in the positional signal represents a position of a pixel of the image data output from the light-receiving unit 21. The positional signal is converted by the controller 15 into a coordinate representing a position of a pixel of an image which is drawn by the controller 15.

3. Light Curtain Installation Method

Next, an installation method of the light curtain will be described with reference to FIG. 4.

FIG. 4 illustrates a flow of a job of fixing the first housing 1$a$ and the screen 1$c$ to a wall surface, a desk, or the like, fixing the second housing 1$b$ with respect to the image plane F of the screen 1$c$, and then adjusting the posture of the light-emitting unit 20. According to the present example, the screen 1$c$ is fixed on the wall surface, the image plane F is set on the center portion of the surface of the screen 1$c$, and the second housing 1$b$ is fixed to the screen 1$c$. In this way, the second housing is fixed with respect to the image plane F. Here, the image plane F may be set on a part of the wall surface without using the screen 1$c$ and the second housing 1$b$ may be fixed on the wall surface with the image plane set on a part of the screen 1$c$ fixed on the wall surface.

When the second housing 1$b$ is fixed with respect to the image plane F, a user continuously rotates the dials 23$a$ and 23$b$ of the second housing 1$b$ in a first direction and sets the posture of the light-emitting unit 20 such that a distance between the light radiated from the light-emitting unit 20 and the image plane F (S1) is maximized.

Next, the user rotates the dials 23$a$ and 23$b$ in a direction opposite to the first direction and adjusts a distance between a plane of the light radiated from the light-emitting unit 20 and the image plane F to a predetermined distance at two predetermined positions (S2). At this time, for example, pins may be positioned upright at the two predetermined places on the image plane F and an amount of rotating of the dials 23$a$ and 23$b$ may be adjusted such that a portion of the pin which is spaced from the image plane F by a predetermined distance is illuminated with the light radiated from the light-emitting unit 20.

Next, the user checks whether distances between the image plane F and the plane of light radiated from the light-emitting unit 20 at other two positions on the image plane F are the predetermined distance (S3). At this time, for example, pins may be positioned upright at the two other predetermined places on the image plane F and the user may check whether a portion of the pin which is spaced from the image plane F by a predetermined distance is illuminated with the light radiated from the light-emitting unit 20. In this way, it is possible to prevent the posture of the light-emitting unit 20 from being adjusted using a distance mistakenly measured between the image plane F and the plane of the reflected light from the image plane F. When the light-emitting unit 20 is correctly installed, the light radiated from the light-emitting unit 20 travels in parallel with the image plane F.

Next, the user executes calibration (S4). Specifically, for example, the controller 15 of the projector 1 sequentially displays multiple markers in a predetermined region on the image plane F. The user touches the markers which are sequentially displayed, with a finger. When the image plane F is brought into contact with the finger, the position detecting unit 22 inputs the positional signal to the controller 15. When the positional signal is input from the position detecting unit 22, the controller 15 sets a transformation matrix that determines a correlation between a coordinate of any random pixel of the image data output from the light-receiving unit 21 and a coordinate of any random pixel of an image which is drawn by the controller 15 on the basis of the positional signal input from the position detecting unit 22 and a coordinate at which the marker is drawn by the controller 15.

Next, the user finally checks the installation state of the light curtain (S5). Here, the user checks whether an operation position with respect to the image plane F is correctly recognized at a coordinate of the image drawn by the projector 1. Hereinafter, descriptions will be provided in detail with reference to FIG. 5 and FIGS. 6A to 6D.

Figure 6A:
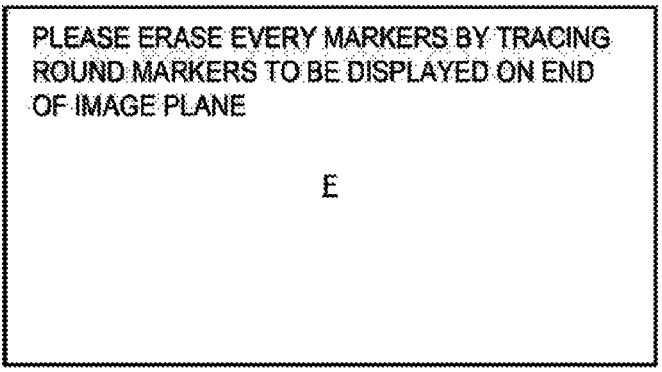
FIGS. 6A to 6D are layouts of image planes of the embodiment of the invention.

First, the projector 1 displays guidance illustrated in FIG. 6A on the image plane F in accordance with the user's instruction (S11). Specifically, when a predetermined operation of the operation unit 18 is performed, the controller 15 displays guidance for guiding a job which the user has to perform next on the image plane F. The job which the user has to perform next is to touch all of a plurality of round markers M which are displayed on the image plane F by the projector 1 as illustrated in FIG. 6B.

Figure 6B:
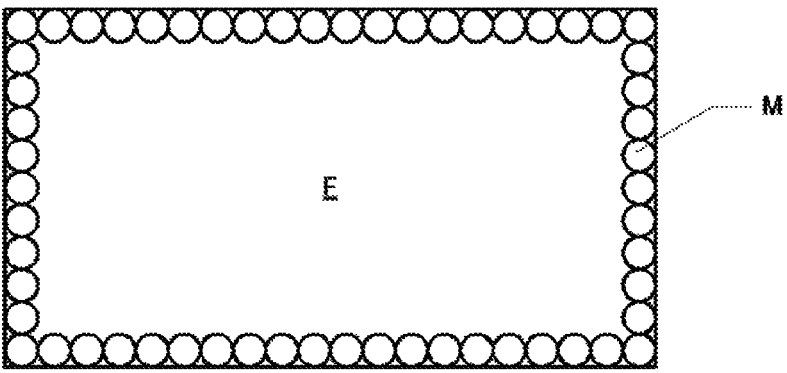

After the controller 15 displays the guidance illustrated in FIG. 6A on the image plane F, the controller 15 displays the plurality of round markers M on the circumferential edge section on the image plane F as illustrated in FIG. 6B (S12). The markers M are displayed on the circumferential edge section on the image plane F which is predetermined as a target region. That is, the controller 15 draws an image such that the round markers M are displayed by reference pixels which are pixels corresponding to the target region and outputs a projection signal to the liquid crystal drive unit 11. As a result, the liquid crystal panels 10a, 10b, and 10c are driven by the liquid crystal drive unit 11 and the round markers M are displayed on the image plane F by transmitted light of the liquid crystal panels 10a, 10b, and 10c of light radiated from the projection light source 17.

Figure 6C:
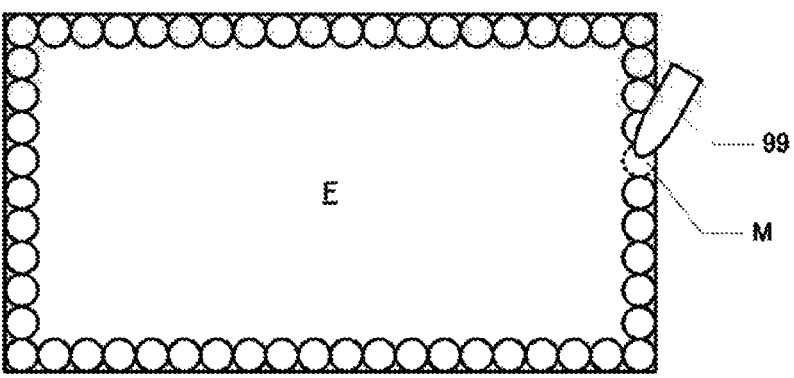

Next, the controller 15 repeats determination of whether or not the finger 99 is detected, which comes into contact with the target region on the image plane F on which the markers M are displayed until the finger 99 is detected on the basis of the positional signal input from the position detecting unit 22 (S13). When the finger 99 comes into contact with the target region on the image plane F on which the markers M are displayed as illustrated in FIG. 6C, the positional signal corresponding to the target region is input to the controller 15 from the position detecting unit 22 as long as the light-emitting unit 20 is correctly installed and ambient light has no influence thereon. As a result, the controller 15 detects the finger 99 that comes into contact with the target region on the image plane F on which the markers M are displayed.

When the finger 99 that comes into contact with the target region on the image plane F is detected, the controller 15 erases a marker M on the target region in which contact of the finger 99 is detected (S14). That is, the controller 15 draws an image such that a drive state of the reference pixel corresponding to the target region in which the contact of the finger 99 is detected is changed, thereby erasing the marker M.

Figure 6D:
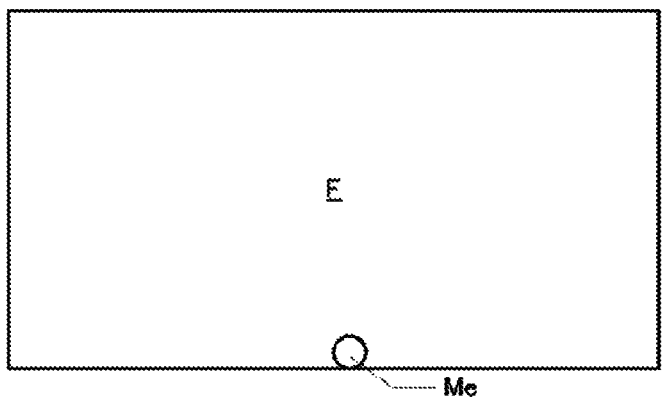
Figure 9:
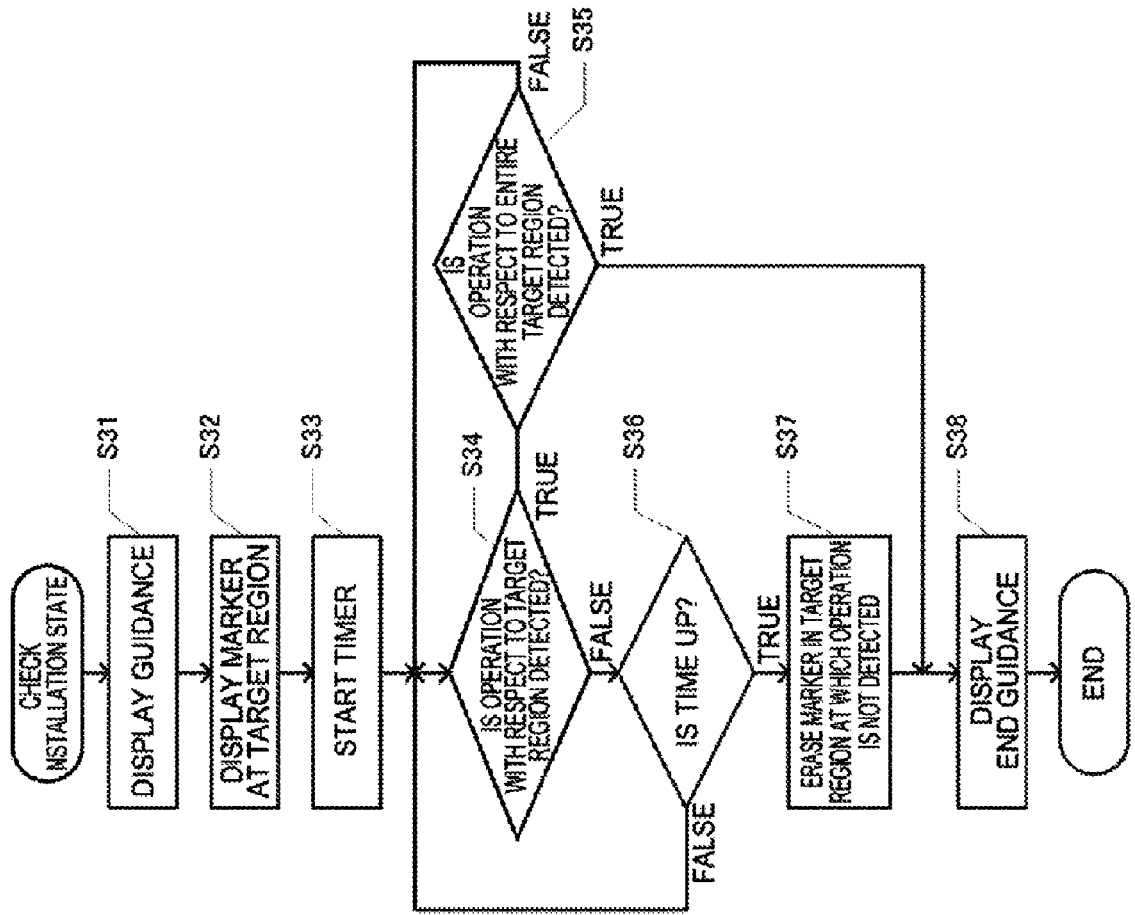
FIG. 9 is a flowchart of the embodiment of the invention.

Next, the controller 15 determines whether or not the entire markers M are erased (S15). The controller 15 repeats the processes from Step S13 when the entire markers M are not erased, guidance is displayed on the image plane F (S16) when the entire markers M are erased, and an installation state checking process ends. When the display of the marker Me continues as illustrated in FIG. 6D although the user touches the entire markers M displayed on the image plane F with a finger, the user can easily recognize that it is a state in which it is not possible to detect the operation with respect to the image plane F in the region in which the marker Me is displayed. In this case, it is necessary that the first housing 1a is re-disposed such that the image plane F is decreased in size, or that a tape or the like which has properties of absorbing the light with the infrared wavelength, is stuck on the periphery of the image plane F, such that the ambient light is not detected.

According to the example described above, the user can easily and immediately recognize whether or not the light curtain is correctly installed by checking whether or not it is possible to erase the marker M by touching the markers M displayed on the image plane F with a finger. In addition, the user can easily recognize a position of the target region which has to be checked for whether or not it is possible to detect the contact of the object by the marker M displayed by the projector 1. Since the target region is set on the circumferential edge section of the image plane F so as to display the markers M, it is possible to check or adjust efficiently the installation state of the light curtain.

4. Another Embodiment

A technical range of the invention is not limited to the example described above. Needless to say, the invention can be modified in various ways within a range without departing from the gist of the invention.

According to the invention, depending on a result of determination of whether or not it is possible to detect the object that comes into contact with the target region on the image plane, the drive state of the reference pixel after determination may be different or, for example, the marker may be displayed by the reference pixel when it is possible to detect the object that comes into contact with the target region on the image plane and the marker may not be displayed by the reference pixel when it is not possible to detect the object that comes into contact with the target region on the image plane. An embodiment in which the marker is displayed by the reference pixel will be described when it is possible to detect the object that comes into contact with the target region on the image plane, with reference to FIG. 7 and FIGS. 8A to 8C.

First, the controller 15 displays guidance for guiding the job which the user has to perform next on the image plane F, for example, as illustrated in FIG. 8A (S21). The job which the user has to perform next is to trace the circumferential edge section of the image plane F set as the target region with a finger. Next, the controller 15 repeats the determination of whether or not the finger 99 which comes into contact with the target region on the image plane F is detected on the basis of the positional signal input from the position detecting unit 22 until the finger 99 is detected (S22). At this time, the marker that indicates the target region is not displayed on the image plane; however, the user already recognizes, by the guidance, that the circumferential edge section of the image plane F is the target region. When the finger 99 which comes into contact with the target region on the image plane F is detected, the controller 15 displays the marker M in the target region in which the contact of the finger 99 is detected as illustrated in FIG. 8B (S23). That is, the controller 15 draws an image such that the drive state of the reference pixel corresponding to the target region, in which the contact of the finger 99 is detected, is changed, thereby displaying the marker M. Next, the controller 15 determines whether or not the entire markers M are displayed (S24). The controller 15 repeats the processes from Step S22 when the entire markers M are not displayed, the end guidance is displayed on the image plane F when the entire markers M are displayed (S16), and the installation state checking process ends. When there is a region E in which a marker M is not displayed as illustrated in FIG. 8C although the user traces round the circumferential edge section of the image plane F with a finger, the user can easily recognize that it is a state in which it is not possible to detect an operation with respect to the image plane F in the region E.

In addition, the markers may be displayed in the target region in advance and the markers may be erased when it is not possible to detect the object that comes into contact with the target region on the image plane. An embodiment, in which the markers are erased when it is not possible to detect the object that comes into contact with the target region on the image plane, will be described with reference to FIG. 9 and FIGS. 10A to 10D. First, the controller 15 displays guidance for guiding the job which the user has to perform next, on the image plane F, for example, as illustrated in FIG. 10A (S31). The job which the user has to perform next is to trace the circumferential edge section of the image plane F set as the target region with a finger within one minute. Next, the controller 15 displays a plurality of round markers M on the circumferential edge section of the image plane F which is the target region as illustrated in FIG. 10B (S32). Next, the controller 15 sets the timer to one minute and the timer starts (S33). Next, the controller 15 determines whether or not the finger 99 that comes into contact with the target region on the image plane F is detected on the basis of the positional signal input from the position detecting unit 22 (S34). Here, although the controller 15 detects the finger 99 which is in contact with the target region on the image plane F, the marker M in the target region at which the finger 99 that is in contact is detected is not erased as illustrated in FIG. 10C. The controller 15 determines whether or not the finger 99 which comes into contact with the target region is detected with respect to the entire target region (S35) in a case where the finger 99 which comes into contact with the target region on the image plane F is detected and the controller 15 repeats the processes from the determination in Step S34 in a case where there remains a target region in which the finger 99 which comes into contact with the target region is not detected. The controller 15 determines whether or not one minute set in the timer is up in a case where the finger 99 which comes into contact with the target region on the image plane F is not detected in Step S34 (S35) and the controller 15 repeats the processes from the determination in Step S34 in a case where the time is not up. The controller 15 erases the marker M displayed in the target region in which the finger 99 which comes into contact with the target region is not detected (S37) in a case where the time of the timer is up. In this way, according to the embodiment in which the marker M is displayed and erased, the display of the marker continues in a case where it is possible to detect an object and the display of the marker is stopped in a case where it is not possible to detect the object within a fixed time. Therefore, it is not possible for the user to immediately recognize a region in which it is not possible to detect the object. However, when there is a region E in which a marker M is not displayed as illustrated in FIG. 10D, although the user traces round the circumferential edge section of the image plane F with a finger within one minute, the user can easily recognize that it is a state in which it is not possible to detect an operation with respect to the image plane F in the region E.

Figure 11A:
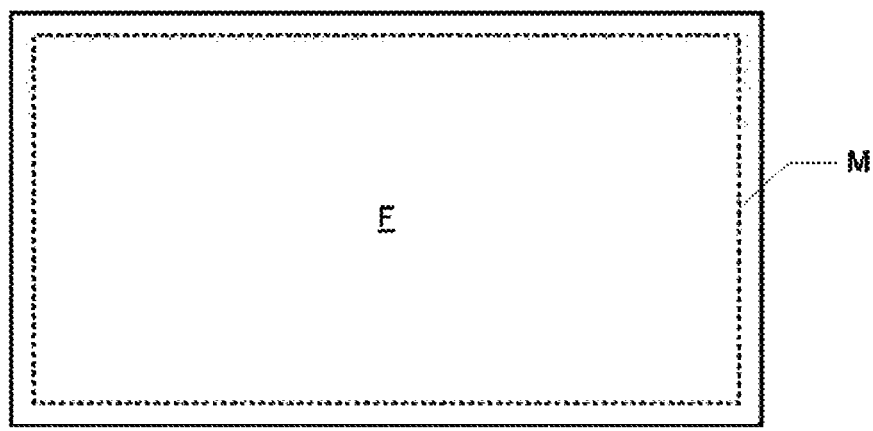
FIGS. 11A to 11C are layouts of the image planes of the embodiment of the invention.
Figure 11B:
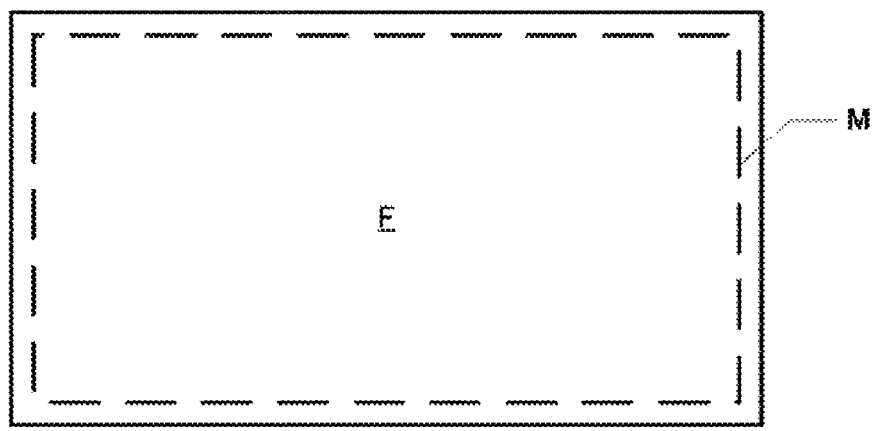
Figure 11C:
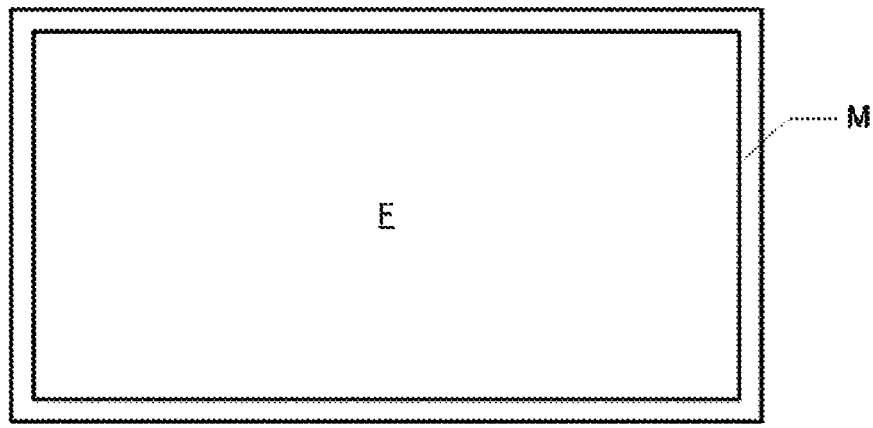

In addition, the marker may be displayed in any shape in the target region on the image plane using the reference pixel, for example, in a dotted line as illustrated in FIG. 11A, in a dashed line as illustrated in FIG. 11B, in a combination of the dashed line and the dotted line, or in a continuous line as illustrated in FIG. 11C. The marker with such a line shape is displayed and, thereby, it is possible to easily recognize whether or not it is possible to detect the contact of the object in the target region which extends in a line shape. In addition, one or more target regions may be set in any region of the image plane and, for example, the center region of the image plane which represents a point by one reference pixel may be the target region.

In addition, the light-receiving unit and the position detecting unit of the light curtain may not be accommodated in the same housing as the light-emitting unit. For example, the position detecting unit may be accommodated in the same housing with the display unit or the light-receiving unit and the position detecting unit may be accommodated in the same housing with the display unit. In addition, the wavelength of the light radiated from the light-emitting unit of the light curtain may not be the infrared wavelength. For example, the light with an ultraviolet wavelength may be radiated from the light-emitting unit.

In addition, for example, in order to project an image, the light may be modulated using one liquid crystal panel, the light may be modulated using a reflective liquid crystal panel, or the light may be modulated using a digital mirror device (DMD). In addition, for example, a convex mirror may be used or a mirror may not be used in order to expand and project a projection image. In addition, for example, the invention may be applied to an interactive display apparatus that includes a large-sized flat panel display and the light curtain.

The entire disclosure of Japanese Patent Application No. 2014-068253, filed Mar. 28, 2014 is expressly incorporated by reference herein.

What is claimed is:

1. A light curtain installation method for adjusting or checking an installation state of a light curtain for detecting an operation with respect to an image plane of a display apparatus, the method comprising:
   determining whether or not it is possible to detect an object that comes into contact with a target region on the image plane which corresponds to a reference pixel which is a pixel at a predetermined position; and
   setting a drive state of the reference pixel such that the drive state of the reference pixel is different depending on a result of the determining,
   wherein a plurality of markers are displayed in the target region on the image plane by the reference pixel in the determining,
   wherein the display of the markers is stopped in the setting in a case where it is possible to detect the object, wherein the display of the markers continues in the setting in a case where it is not possible to detect the object, and wherein the target region is a circumferential edge section of the image plane.

2. The light curtain installation method according to claim 1, wherein the drive state of the reference pixel is changed in the setting in a case where it is possible to detect the object, and wherein the drive state of the reference pixel is not changed in the setting in a case where it is not possible to detect the object.

3. The light curtain installation method according to claim 1, wherein the marker is displayed in the target region on the image plane by the reference pixel in the setting in a case where it is possible to detect the object, and wherein the marker is not displayed in the setting in a case where it is not possible to detect the object.

4. The light curtain installation method according to claim 1, wherein a marker is displayed in the target region on the image plane by the reference pixel in the determining, wherein the display of the marker continues in the setting in a case where it is possible to detect the object, and wherein the display of the marker is stopped in the setting in a case where it is not possible to detect the object.

5. The light curtain installation method according to claim 1, wherein the marker is formed of a dotted line, a dashed line, or a combination thereof.

6. The light curtain installation method according to claim 1, wherein the marker is formed of a continuous line.

7. An interactive display apparatus comprising:

a display unit that has pixels arranged in a matrix shape and displays an image on an image plane by driving the pixels;

a light-emitting unit that is installed with respect to the image plane and radiates light in a plane shape;

a position detecting unit that receives and photoelectrically converts direct or reflected light of the light radiated from the light-emitting unit and outputs a positional signal in response to the direct or reflected light; and a control unit that performs determination of whether or not it is possible to detect an object that comes into contact with a target region on the image plane which corresponds to a reference pixel which is a pixel at a predetermined position, based on the positional signal, and sets a drive state of the reference pixel such that the drive state of the reference pixel is different depending on a result of the determining, wherein a plurality of markers are displayed in the target region on the image plane by the reference pixel in the determination performed by the control unit, wherein the display of the markers is stopped in the setting in a case where it is possible to detect the object, wherein the display of the markers continues in the setting in a case where it is not possible to detect the object, and wherein the target region is a circumferential edge section of the image plane.

* * * * *